(12) United States Patent
Huizinga et al.

(10) Patent No.: US 7,998,521 B2
(45) Date of Patent: Aug. 16, 2011

(54) NON-HYDROGENATED HARDSTOCK FAT

(75) Inventors: Hindrik Huizinga, At Vlaardingen (NL); Cornelis Laurentius Sassen, At Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 744 days.

(21) Appl. No.: 11/990,798

(22) PCT Filed: Aug. 11, 2006

(86) PCT No.: PCT/EP2006/008023
§ 371 (c)(1), (2), (4) Date: Feb. 21, 2008

(87) PCT Pub. No.: WO2007/022897
PCT Pub. Date: Mar. 1, 2007

(65) Prior Publication Data
US 2009/0246348 A1    Oct. 1, 2009

(30) Foreign Application Priority Data
Aug. 23, 2005 (EP) .................................. 05076933

(51) Int. Cl.
A23D 9/00 (2006.01)
(52) U.S. Cl. ........................ 426/607; 426/603
(58) Field of Classification Search .............. 426/607, 426/606, 603
See application file for complete search history.

(56) References Cited

U.S. PATENT DOCUMENTS

| | | | |
|---|---|---|---|
| 4,360,536 A * | 11/1982 | Keuning et al. | 426/603 |
| 4,366,181 A * | 12/1982 | Dijkshoorn et al. | 426/603 |
| 4,486,457 A * | 12/1984 | Schijf et al. | 426/603 |
| 4,533,561 A * | 8/1985 | Ward | 426/603 |
| 5,858,445 A * | 1/1999 | Huizinga et al. | 426/607 |
| 6,033,695 A | 3/2000 | Cain et al. | |
| 6,106,885 A * | 8/2000 | Huizinga et al. | 426/607 |
| 6,156,370 A * | 12/2000 | Huizinga et al. | 426/607 |
| 6,231,914 B1 * | 5/2001 | Huizinga et al. | 426/607 |
| 7,618,670 B2 * | 11/2009 | Ullanoormadam | 426/607 |
| 7,645,473 B2 * | 1/2010 | Herzing et al. | 426/607 |
| 7,700,146 B2 * | 4/2010 | Cleenewerck | 426/607 |
| 7,785,645 B2 * | 8/2010 | Siew et al. | 426/606 |
| 7,807,208 B2 * | 10/2010 | Ullanoormadam | 426/606 |
| 2005/0019316 A1 * | 1/2005 | Ten Brink et al. | 424/94.6 |

FOREIGN PATENT DOCUMENTS

| | | |
|---|---|---|
| EP | 0151450 | 8/1985 |
| EP | 0488800 | 6/1992 |
| GB | 1444820 | 8/1976 |
| WO | 03/096817 | 11/2003 |

OTHER PUBLICATIONS

Siew, W. L. 1993. Elaeis 5(1)38.*
Ong, A. 1982. Korean J. Food Science Technology 14(2)187.*
Ali et al., "Melting and solidification characteristics of confectionery fats: anhydrous milk fat, cocoa butter and palm kernel stearin blends", Journal of the American Oil Chemists Society, AOCS Press, Champaign, IL, vol. 71, No. 8, 8/94, pp. 803-806, XP002131928.
Graille et al., "Making Value-Added Products from Palm Oil by 1-3 Regioselectivity Enzymatic Interesterification", Elaeis, Institut Penyelidikan Kelapa Sawit, Kuala Lumpur, MY, vol. 4, No. 1, 6/92, pp. 1-10, XP008025711.
Derwent Abstract of JP J54031407, XP002363070.
International Search Report International Application No. PCT/EP2006/008023 mailed Dec. 7, 2006.

* cited by examiner

*Primary Examiner* — Carolyn A Paden
(74) *Attorney, Agent, or Firm* — Gerard J. McGowan, Jr.

(57) ABSTRACT

Non-hydrogenated hardstock fat wherein the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt %, process for obtaining such a hardstock fat, a margarine fat comprising the hardstock fat and a spread comprising the hardstock fat.

20 Claims, No Drawings

NON-HYDROGENATED HARDSTOCK FAT

The invention relates to a new hardstock fat which is non-hydrogenated, to a process for obtaining this new hardstock fat to a margarine fat comprising this hardstock fat and to spreads prepared with this hardstock fat.

BACKGROUND

The fat phase of margarine and of similar fat continuous emulsion spreads is often a mixture of a liquid fat or oil and a fat which is solid at room and/or ambient temperature.

The solid fat, denoted as hardstock fat, serves to structure the fat phase and helps to stabilise the emulsion.

Vegetable fats and oils are preferred over animal fats because their unsaturated fat composition enhances the spread's nutritional value.

The present trend in food processing is to avoid processing, particularly chemical processing as much as possible and to opt for natural ingredients and natural processing. Consumers prefer products that have natural ingredients and that have not been subjected to chemical treatment or modification.

However, natural, non-processed vegetable fats which are suited as hardstock fat are rather rare. Hydrogenating is still an often used treatment for turning liquid vegetable oils into suitable hardstock fats.

EP-A-0151450 discloses a fat blend having a relatively low level of trans fatty acids, preferably lower than 10% which is obtained by random interesterification of a lauric fat, a hydrogenated fat and a liquid oil.

Another disadvantage is the use of liquid oil because it is expected that the price of liquid oil and especially of rapeseed oil will increase due to the increasing demand of these liquid oils as so-called "biodiesel" for cars.

It is therefore an object of the invention to provide a hardstock fat that has not undergone hydrogenation. Another object of the invention is to provide a hardstock fat that is not made from liquid oil. Yet another object of the invention is to provide a hardstock fat that is made from less expensive ingredients.

One or more of the objections is attained by a non-hydrogenated hardstock wherein the combined amount of saturated fatty acids having a length of C12 and C14 is 12 to 24 wt %, the combined amount of saturated fatty acids having a length of C16 and C18 is 20 is 28 to 50 wt %, the amount of saturated fatty acids with a length of C18 is 6 to 12 wt %, and the total amount of fully saturated fatty acids is less than 72 wt %.

DETAILED DESCRIPTION

The term "hardstock" refers to fat that is solid at room temperature. The hardstock may comprise two or more different hard fats, but is preferably a single fat. The hardstock fat may be an interesterified mixture of one or more fats.

A "margarine fat" is a fat blend which is suitable for use as a fat in spreads, both fat-continuous and water-continuous, such a margarine fat usually includes a hardstock and a liquid oil. The term "liquid oil" is used in this specification for fats that are liquid at room temperature preferably also liquid at temperature below room temperature such as below 15, 10 or 5° C. Preferably the solid fat content of the liquid oil is 0 at 20° C., more preferably it is 0 at 15° C.

Solid fats from which lower melting constituents have been removed will be indicated as "stearin fractions". A stearin fraction for the purpose of this description is defined as a triglyceride mixture or fat blend from which at least 10% of the lower melting constituents have been removed by some kind of fractionation, e.g. dry fractionation, multi-stage countercurrent dry fractionation or solvent fractionation.

The lower melting constituents are indicated as "olein fraction".

In this specification all parts, proportions and percentages are by weight; the amount of fatty acids in an oil or fat is based on the total amount of fatty acids in said oil or fat and the amount of hardstock and/or hard fat in the fat composition is based on the total weight of said fat composition, unless otherwise stated.

The solid fat content (SFC) in this description and claims is expressed as N-value, essentially as defined in Fette, Seifen Anstrichmittel 80 180-186 (1978). The stabilisation profile applied is heating to a temperature of 80° C., keeping the oil for at least 10 minutes at 60° C. or higher, keeping the oil for 16 hours at 0° C. and then 30 minutes at the measuring temperature, except where indicated otherwise.

Non-hydrogenated means that the fat or oil has not undergone any hydrogenation treatment. This entails the starting ingredients as well as blends and interesterified mixtures and even fractions of fats. Non-hydrogenated fats have essentially no trans-fatty acids. Preferably the fat has less than 5 wt % of trans fatty acids, more preferably less than 1 wt % or even 0 wt %.

The present invention is suitable for more natural products. More natural means that the product has undergone less modifications or preferably even no modifications other than refining and purification. Natural also encompasses the use of non-chemical variants of treatments, for example dry (non solvent) fractionation instead of wet-(solvent) fractionation, with e.g. acetone, hexane or lanza and enzymatic rearrangement instead of chemical randomisation.

In a preferred embodiment of the present invention the combined amount of saturated-fatty acids having a length of C12 and C14 is 13 to 22 wt %, more preferably 17 to 20 wt %. Suitable amounts of saturated fatty acids having a length of C16 and C18 is 35 to 48 wt %. The amount of saturated fatty acids with a length of C18 is preferably at least 8 wt % more preferably at least 10 wt %.

The weight percentage is given on the hardstock fat.

The total amount of saturated fatty acid of the hardstock according to the invention preferably is less than 65 wt %, more preferably less than 60 wt %.

In one embodiment the hardstock fat according to the invention has a solid fat content of 47 to 76% at 10° C., 23 to 54% at 20° C., 5 to 26% at 30° C. and less than 14 at 35° C. More preferably the hardstock fat has a solid fat content of 50 to 65% at 10° C., 26 to 48% at 20° C., 7 to 21% at 30° C. and less than 12 at 35° C.

The present invention also relates to a hardstock fat comprising an interesterified mixture of 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length.

The liquid vegetable fat is a fat that is liquid at room temperature. The liquid fat may be a single fat or a blend of more than one fat. Suitable liquid fats may be selected from the group comprising rapeseed oil, sunflower oil, safflower oil, linseed oil, corn oil, groundnut oil, soybean oil, linola oil and blends thereof.

Suitable amounts of liquid fat may be 0 to 15 wt %. Preferably the interesterified mixture does not contain liquid oil. It is expected that liquid vegetable oil, and especially rapeseed oil will become increasingly more expensive due to the increased amount of rapeseed oil and other liquid vegetable fats as "bio-diesel" for cars. The hardstock fat of the present invention has the advantage that it can be made without any liquid oil.

The interesterified mixture comprises a lauric fat. A lauric fat is a fat that has a lauric fatty acid content of at least 35 wt %, preferably at least 40 wt %. The lauric fat may be a single fat or a blend of more than one lauric fat. Preferably 22 to 32 wt % of lauric fat is used in the interesterified mixture. Suitably the lauric fat is selected from the group comprising palm kernel fat, coconut fat and babassu. Also fractions of the lauric fat may used. Preferably the fat is dry-fractionated to retain the naturalness of the hardstock fat.

Palm oil is present in the interesterified mixture. The palm oil may be only palm oil, a fraction of palm oil or any combination thereof, such as a blend of a palm oil and a palm fraction or a blend of palm oil fractions. Palm oil fractions may be both olein as stearin fractions. Stearin fraction of palm oil is preferred. The amount of the palm oil is preferably 40 to 60 wt %.

The high C18 fat may be a single fat or a blend of more than one fat. The high C18 fat has at least 20 wt %, preferably at least 25 wt % of saturated fatty acids with C18 length. It may also be preferred that the high C18 fat has 20 to 30 wt % of saturated fatty acids of C18 length. The weight percentage is on high C18 fat. Preferably 15 to 30 wt % of high C18 fat is used in the interesterified mixture.

Furthermore, in another preferred embodiment the high C18 fat is selected from the group comprising shea fat or even shea butter as it is often called, illipe pentadesma, shea olein, or shea stearin. A preferred fat is shea olein, as this is a relatively cheap fat being the side-product of the production of shea stearin.

In addition, the present invention also relates to a process for producing a hardstock fat according to the invention comprising:

interesterifying a mixture containing 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length, optionally fractionating the interesterified mixture, such that the resulting fat has a combined amount of saturated fatty acids having a length of C12 and C14 of 12 to 24 wt %, the combined amount of saturated fatty acids having a length of C16 and C18 of 28 to 50 wt %, the amount of saturated fatty acids with a length of C18 is 6 to 12 wt %, and the total amount of fully saturated fatty-acids of less than 72 wt %, wherein all fats in the mixture are non-hydrogenated and the mixture is not hydrogenated.

The liquid fat may be a single fat or a blend of more than one fat. Liquid vegetable oil that is preferred may be selected from the group comprising rapeseed oil, sunflower oil, safflower oil, linseed oil, corn oil, groundnut oil, soybean oil, linola oil and blends thereof.

Preferably the interesterified mixture contains 0 to 15 wt % of liquid oil and more preferably does not contain liquid oil.

Preferably 22 to 32 wt % of a lauric fat is used in the interesterified mixture. The lauric fat may be a single fat or a blend of more than one lauric fat. Suitably the lauric fat may be selected from the group comprising palm kernel fat, coconut fat and babassu fat and combinations thereof.

The palm oil may be only palm oil, a fraction of palm oil or a any combination thereof. The amount of the palm oil is preferably 40 to 60 wt %.

Preferably the high C18 fat has at least 25 wt % of saturated fatty acids of C18 length. It may also be preferred that the high C18 fat has 20 to 30 wt % of saturated fatty acids of C18 length. A preferred high C18 fat is selected from the group comprising shea fat, pentadesma, illipe, shea olein, or shea stearin. A preferred fat is shea olein. Preferably 15 to 30 wt % of a high C18 fat is used in the interesterified mixture. In a preferred embodiment of the present invention the combined amount of saturated fatty acids having a length of C12 and C14 is 13 to 22 wt %, more preferably 17 to 20 wt %. Suitable amounts of saturated fatty acids having a length of C16 and C18 is 35 to 48 wt %. The amount of saturated fatty acids with a length of C18 is preferably at least 8 wt % more preferably at least 10 wt %.

The total amount of saturated fatty acid of the hardstock according to the invention preferably is less than 65 wt %, more preferably less than 60 wt %.

Preferably the resulting fat has a solid fat content of 47 to 76% at 10° C., 23 to 54% at 20° C., 5 to 26% at 30° C. and less than 14 at 35° C. More preferably the hardstock fat has a solid fat content of 50 to 65% at 10° C., 26 to 48% at 20° C., 7 to 21% at 30° C. and less than 12 at 35° C.

In a preferred embodiment of the present invention the interesterification is catalysed by enzymes. Rearrangement by enzymes enhances the naturalness of the fat of the present invention.

Optionally the interesterified mixture is further fractionated. Preferably the interesterified mixture is dry-fractionated.

The present invention further relates to a margarine fat comprising a liquid vegetable oil in an amount of 30 to 80 wt % and a hardstock fat according to the invention in an amount of 20 to 70 wt %. Preferably the amount of hardstock fat in the margarine fat is 30 to 70 wt %, more preferably 40 to 65 wt %. The amount of liquid oil is preferably 30 to 70 wt %, more preferably 35 to 60 wt %. The weight percentages are on margarine fat.

Suitable liquid vegetable oils for the margarine fat are selected from the group comprising rapeseed oil, sunflower oil, safflower oil, linseed oil, corn oil, groundnut oil, soybean oil, linola oil and blends thereof.

Furthermore the present invention relates to a margarine or fat-continuous spread comprising a margarine fat according to the invention.

In another embodiment the present invention also relates to a water-continuous spread comprising a margarine fat according to the invention.

EXAMPLES

Example 1

A hardstock having the following composition was produced:

TABLE 1

| Fat blend | amount (wt %) |
| --- | --- |
| Palm kernel oil | 22 |
| Palm oil stearin (s.m.p. 53° C.) | 50 |
| Shea fat olein (I.V. 63) | 28 |

The hardstock fat was produced by blending the fats from table 1 and interesterifying this blend.

The resulting hardstock fat had the following fatty acid profile:

TABLE 2

| fatty acid | amount (wt %) |
| --- | --- |
| C12 + C14 | 14.1 |
| C16 + C18 | 47.1 |
| C18 | 11.6 |
| SAFA | 63.4 |

Example 2

A hardstock having the following composition was produced:

TABLE 3

| Fat blend | amount (wt %) |
| --- | --- |
| Palm oil | 27 |
| Palm kernel oil | 20 |
| Palm oil stearin (s.m.p. 53° C.) | 41 |
| Shea fat olein (IV 63) | 12 |

The hardstock fat was produced by blending the fats from table 3 and interesterifying this blend.

The resulting hardstock fat had the following fatty acid profile:

TABLE 4

| fatty acid | amount (wt %) |
| --- | --- |
| C12 + C14 | 13.2 |
| C16 + C18 | 48.2 |
| C18 | 7.7 |
| SAFA | 63.5 |

Example 3

A hardstock having the following composition was produced:

TABLE 5

| Fat blend | amount (wt %) |
| --- | --- |
| Palm kernel oil | 30 |
| Palm oil stearin (s.m.p. 53° C.) | 60 |
| Shea fat olein (IV 63) | 10 |

The hardstock fat was produced by blending the fats from table 5 and interesterifying this blend.

The resulting hardstock fat had the following fatty acid profile:

TABLE 6

| fatty acid | amount (wt %) |
| --- | --- |
| C12 + C14 | 19.2 |
| C16 + C18 | 48.9 |
| C18 | 7.4 |
| SAFA | 70.7 |

Example 4

TABLE 7

| Fat blend | amount (wt %) |
| --- | --- |
| Palm oil | 9 |
| Palm kernel oil | 33 |
| Palm oil stearin (s.m.p. 53° C.) | 50 |
| Shea fat olein (IV 63) | 8 |

The hardstock fat was produced by blending the fats from table 7 and interesterifying this blend.

The resulting hardstock fat had the following fatty acid profile:

TABLE 8

| fatty acid | amount (wt %) |
| --- | --- |
| C12 + C14 | 21.3 |
| C16 + C18 | 45.9 |
| C18 | 6.6 |
| SAFA | 69.9 |

The invention claimed is:

1. A margarine fat comprising:
   (1) a liquid vegetable oil in an amount of 30 to 80 wt % and
   (2) a hardstock fat in an amount of 20 to 70 wt %, wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt %.

2. Spread comprising a margarine fat according to claim 1.

3. A hardstock fat wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt %.

4. A process for producing a non-hydrogenated hardstock fat according to claim 3 comprising:
   interesterifying a mixture containing 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length
   wherein all fats in the mixture are non-hydrogenated fats and no hydrogenation is carried out during the process.

5. A process according to claim 4, wherein the liquid vegetable oil is selected from the group comprising rapeseed oil, sunflower oil, safflower oil, linseed oil, corn oil, groundnut oil, linola oil, and blends thereof.

6. A process according to claim 4 wherein the lauric fat is selected from the group comprising palm kernel fat.

7. A process according to claim 4, wherein the interesterification is catalysed by enzymes.

8. The process according to claim 4 further comprising fractionating the interesterified mixture such that the resulting fat has a combined amount of saturated fatty acids having a length of C12 and C14 of 12 to 24 wt %, the combined amount of saturated fatty acids having a length of C16 and C18 of 28 to 50 wt %, the amount of saturated fatty acids with a length of C18 is 6 to 12 wt %, and the total amount of fully saturated fatty acids of less than 72 wt %.

9. The hardstock fat according to claim 3 wherein the vegetable source is selected from shea fat, illipe, pentaesma, shea olein, and shea stearin.

10. A margarine fat comprising:
    (1) a liquid vegetable oil in an amount of 30 to 80 wt % and
    (2) a hardstock fat in an amount of 20 to 70 wt %, wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids with a length of C18 is 6 to 12 wt %, and the total amount of fully saturated fatty acids with a length of C18 is 6 to 12 wt %, and the total amount of fully saturated fatty acids is less than 72 wt % wherein the hardstock fat has a solid fat content of 47 to 76% at 10° C., 23 to 54% at 20° C., 5 to 26% at 30° C. and less than 14 wt % at 35° C.

11. A margarine fat comprising:
    (1) a liquid vegetable oil in an amount of 30 to 80 wt % and
    (2) a hardstock fat in an amount of 20 to 70 wt %, wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt %
    wherein the hardstock fat comprises an interesterified mixture of 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length.

12. A margarine fat according to claim 11 wherein the high C18 fat has 20 to 30 wt % of saturated fatty acids of C18 length.

13. A margarine fat according to claim 11 wherein the liquid vegetable oil is selected from the group comprising rapeseed oil, sunflower oil, safflower oil, linseed oil, corn oil, groundnut oil, linola oil and blends thereof.

14. A margarine fat according to claim 11 wherein the lauric fat is selected from the group comprising palm kernel fat, coconut fat and babassu fat.

15. A margarine fat according to claim 11, wherein the high C18 fat is shea olein.

16. A process for producing a non-hydrogenated hardstock fat wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt % including:
    interesterifying a mixture containing 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length wherein all fats in the mixture are non-hydrogenated and no hydrogenation is carried out during the process
    wherein the resulting fat has a solid fat content of 47 to 76% at 10° C., 23 to 54% at 20° C., 5 to 26% at 30° C. and less than 14 at 35° C.

17. A process for producing a non-hydrogenated hardstock fat, wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt % including:
    interesterifyinq a mixture containing 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length wherein all fats in the mixture are non-hydrogenated and no hydrogenation is carried out during the process
    wherein the high C18 fat is selected from the group comprising shea olein.

18. A hardstock fat:
    wherein the hardstock fat is non-hydrogenated and from a vegetable source and
    wherein in the hardstock fat the combined amount of saturated fatty acids having a length of C12 and C14 is 12 to 24 wt %, the combined amount of saturated fatty acids with a length of C18 is 6 to 12 wt %, and the total amount of fully saturated fatty acids with a length of C18 is 6 to 12 wt %, and the total amount of fully saturated fatty acids is less than 72 wt % wherein the hardstock fat has a solid fat content of 47 to 76% at 10° C., 23 to 54% at 20° C., 5 to 26% at 30° C. and less than 14 wt % at 35° C.

19. A hardstock fat wherein the hardstock fat is non-hydrogenated and from a vegetable source and wherein in the hardstock fat the combined amount of saturated fatty acids having a length of C12 and C14 is 12 to 24 wt %, the combined amount of saturated fatty acids having a length of C16 and C18 is 28 to 50 wt %, the amount of saturated fatty acids with a length of C18 is 6 to 12 wt %, and the total amount of fully saturated fatty acids is less than 72 wt %, wherein the hardstock fat comprises an interesterified mixture of 0 to 20 wt % of a liquid vegetable oil and 15 to 35 wt % of a lauric fat and 35 to 70 wt % of palm oil and 5 to 30 wt % of a high C18 fat which has at least 20 wt % of saturated fatty acids of C18 length.

20. The margarine fat according to claim 1 wherein the vegetable source is selected from shea fat, illipe, pentaesma, shea olein, and shea stearin.

* * * * *